No. 722,551. PATENTED MAR. 10, 1903.
H. C. ADAMSON.
DIVIDERS.
APPLICATION FILED JULY 14, 1902.
NO MODEL.
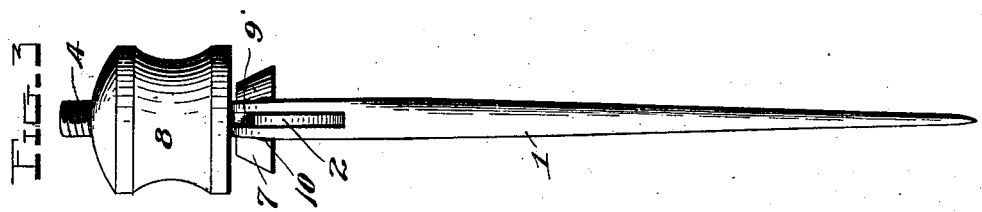
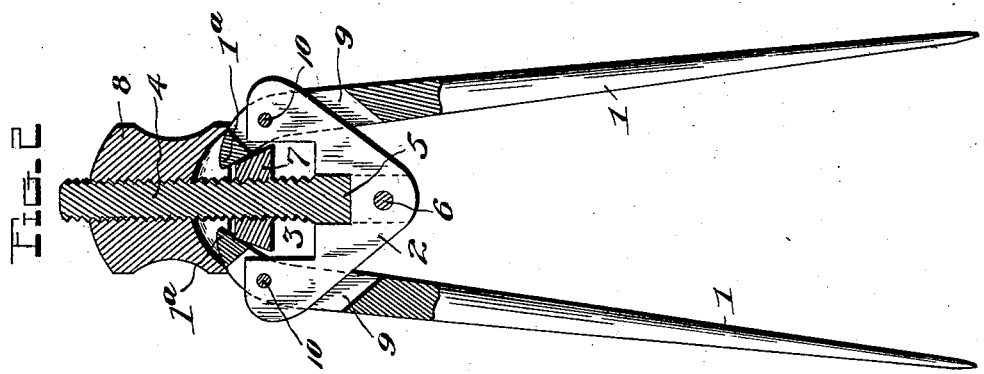
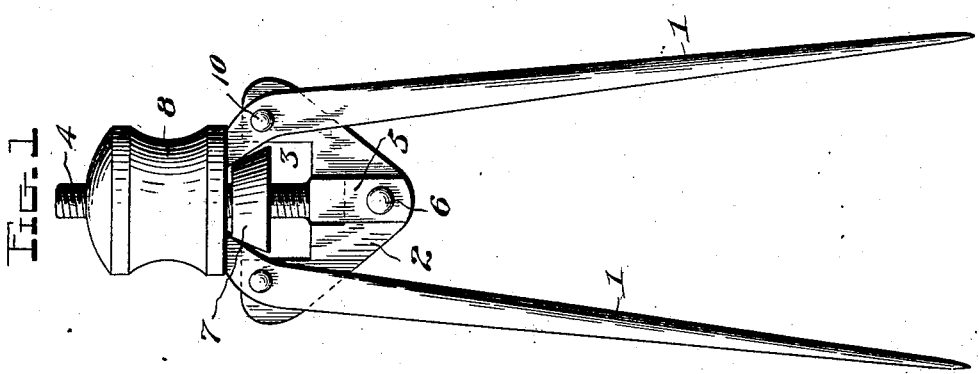
Inventor
H. C. Adamson
Witnesses
By H. B. Willson & Co.
Attorneys

UNITED STATES PATENT OFFICE.

HENRY CLAY ADAMSON, OF PRYORCREEK, INDIAN TERRITORY.

DIVIDERS.

SPECIFICATION forming part of Letters Patent No. 722,551, dated March 10, 1903.

Application filed July 14, 1902. Serial No. 115,493. (No model.)

*To all whom it may concern:*

Be it known that I, HENRY CLAY ADAMSON, a citizen of the United States, residing at Pryorcreek, in the Cherokee Nation, Indian Territory, have invented certain new and useful Improvements in Dividers; and I do declare the following to be a full, clear, and exact description of the invention, such as will enable others skilled in the art to which it appertains to make and use the same.

The invention relates to dividers and calipers, and has for its object to provide an instrument of this character the legs of which can be readily adjusted for the desired measurements and quickly and positively locked in any adjusted position.

A further object is to produce an instrument of the character described which shall be simple and inexpensive in construction, durable and practical in use, and not liable to get out of order.

With these and other objects in view the invention consists in the combination and arrangement of the parts, as will be hereinafter more fully described and claimed.

In the accompanying drawings, Figure 1 is a front elevation of the instrument. Fig. 2 is a longitudinal vertical sectional view, and Fig. 3 is a side view of the same.

In the drawings, 1 denotes the legs of the instrument.

2 denotes an inverted substantially triangular-shaped plate having a rectangular-shaped opening 3 formed in its upper edge, as shown.

4 denotes a vertically-disposed screw or bolt having a bifurcated or forked head 5, which straddles the plate 2 and is set into a notch formed in the lower edge of the opening 3. A rivet 6 passes through the forked head 5 and through the plate 2, thus rigidly connecting the parts, the bolt projecting upwardly.

7 denotes a frusto-conical-shaped nut which is screwed upon the bolt 4 with its base lowermost.

8 denotes a cylindrical nut somewhat larger than the nut 7 and is concaved or hollowed out on its under side. The periphery of this nut may be curved inwardly for lightness and finish.

The upper ends of the legs 1 are curved or bent inwardly and tapered to an edge, as shown at 1ª, and are provided with elongated slots 9, through which project the upper rounded corners of the triangular plate 2, and rivets 10 connect the legs to these parts. The upper bent end 1ª of the legs 1 are engaged above by the concaved side of the nut 8 and on their lower side by the conical sides of the nut 7, and the legs are thereby held in their adjusted position.

In operation to open the legs the nut 7 is screwed to the right or downwardly on the bolt toward the head. The legs are now adjusted to the required degree, and the large nut 8 is screwed down upon the upper ends of the legs. Then the nut 7 is screwed up against the lower side of the ends 1ª, clamping the same securely against the concaved under surface of the top nut.

While I have shown my improvement applied to a pair of dividers in the drawings, it is obvious that the same may be used equally as well in connection with a pair of calipers.

Having thus described my invention, what I claim, and desire to secure by Letters Patent, is—

1. In a pair of dividers or calipers, the combination of an inverted triangular plate, two leg members pivotally connected near their upper ends to the inverted triangular plate, a vertically-disposed threaded bolt having a head fixed to said plate, a nut on said bolt adapted to be screwed down upon the extreme upper ends of said legs, and a smaller nut on said bolt adapted to be screwed up against the lower side of the said upper ends of the leg members to clamp them against the upper nut, substantially as described.

2. A pair of dividers or calipers comprising an inverted triangular plate, two leg members pivotally connected near their upper ends to the corners of the plate, the threaded bolt fixed at its lower end in a slot and opening in said plate and projecting upwardly therefrom, the large upper nut on the bolt having a concaved lower face, the smaller frusto-conical-shaped lower nut adapted to be secured upon said bolt, the tapered or wedge-shaped, inwardly-curved upper ends of the leg members adapted to be clamped between said upper and lower nuts to hold said leg members in any desired position, substantially as set forth.

In testimony whereof I have hereunto set my hand in presence of two subscribing witnesses.

HENRY CLAY ADAMSON.

Witnesses:
JAMES L. MITCHELL,
W. J. WHITAKER.